United States Patent
Parodi

(10) Patent No.: US 12,120,225 B2
(45) Date of Patent: Oct. 15, 2024

(54) SECURE KEY GENERATION AND MANAGEMENT IN OPEN AND SECURE PROCESSOR ENVIRONMENTS

(71) Applicant: Renesas Electronics Corporation, Tokyo (JP)

(72) Inventor: Giancarlo Parodi, Duesseldorf (DE)

(73) Assignee: Renesas Electronics Corporation, Tokyo (JP)

( * ) Notice: Subject to any disclaimer, the term of this patent is extended or adjusted under 35 U.S.C. 154(b) by 549 days.

(21) Appl. No.: 17/033,529

(22) Filed: Sep. 25, 2020

(65) Prior Publication Data

US 2022/0103354 A1    Mar. 31, 2022

(51) Int. Cl.
*H04L 9/08* (2006.01)
*H04L 9/32* (2006.01)

(52) U.S. Cl.
CPC .......... *H04L 9/0861* (2013.01); *H04L 9/0869* (2013.01); *H04L 9/0819* (2013.01); *H04L 9/3242* (2013.01); *H04L 2209/12* (2013.01)

(58) Field of Classification Search
CPC ... H04L 9/0861; H04L 9/0869; H04L 9/3242; H04L 9/0819; H04L 9/14; H04L 9/0643; H04L 9/0866; H04L 9/3271; H04L 9/08; H04L 9/003; H04L 9/00; H04L 9/06; H04L 9/32; H04L 2209/12; H04L 63/06; H04L 63/061; H04L 63/062; H04L 63/0853
USPC ................................. 713/168, 171, 172, 193
See application file for complete search history.

(56) References Cited

U.S. PATENT DOCUMENTS

| | | | | |
|---|---|---|---|---|
| 5,745,576 A | * | 4/1998 | Abraham | H04L 9/0847 705/73 |
| 8,560,849 B2 | * | 10/2013 | Machani | H04L 9/3242 713/168 |
| 9,497,021 B2 | * | 11/2016 | Murray | H04L 9/003 |

(Continued)

FOREIGN PATENT DOCUMENTS

| | | | | |
|---|---|---|---|---|
| CN | 1420480 A | * | 5/2003 | ............. G06F 21/10 |
| CN | 100583767 C | * | 1/2010 | ........... H04L 9/0891 |

(Continued)

OTHER PUBLICATIONS

KR-19980070367-A_Mobile Telephone Company With Confirmation Number Protection System and Method of Protection of Confirmation Number (Machine Translation) by Pitioteu Yang; pp. 4; Oct. 1998.*

(Continued)

*Primary Examiner* — Eleni A Shiferaw
*Assistant Examiner* — Ali H. Cheema
(74) *Attorney, Agent, or Firm* — Foley & Lardner LLP

(57) ABSTRACT

Example implementations include a method of generating a first authentication code based at least partially on an authentication key and an application key, transmitting to a secure subsystem of the local processing device the authentication key, the application key, and the first authentication code, generating, at the secure subsystem, a second authentication code based at least partially on the authentication key and the application key, and generating, at the secure subsystem, a secure application key, in accordance with a determination that the first authentication code and the second authentication code satisfy an authentication criterion.

15 Claims, 7 Drawing Sheets

(56) References Cited

U.S. PATENT DOCUMENTS

| | | | |
|---|---|---|---|
| 2004/0039924 A1* | 2/2004 | Baldwin | H04L 9/0891 |
| | | | 713/189 |
| 2004/0260927 A1* | 12/2004 | Grobman | H04L 9/0891 |
| | | | 713/172 |
| 2009/0013193 A1* | 1/2009 | Matsuzaki | H04L 9/0891 |
| | | | 713/189 |
| 2009/0249492 A1* | 10/2009 | Boesgaard Sorensen | |
| | | | G06F 21/556 |
| | | | 717/136 |
| 2010/0031021 A1* | 2/2010 | Arnold | H04L 9/0637 |
| | | | 713/190 |
| 2011/0138185 A1* | 6/2011 | Ju | G06F 21/10 |
| | | | 380/279 |
| 2012/0303973 A1 | 11/2012 | Newsome et al. | |
| 2014/0201540 A1* | 7/2014 | Li | H04L 9/0822 |
| | | | 713/193 |
| 2017/0060777 A1* | 3/2017 | Sivaramamurthy | H04L 9/0877 |
| 2017/0337390 A1* | 11/2017 | Hamilton | H04L 9/0861 |
| 2019/0394172 A1* | 12/2019 | Hersent | H04L 9/0861 |
| 2020/0267547 A1* | 8/2020 | Tal | H04W 12/50 |

FOREIGN PATENT DOCUMENTS

| | | | | | |
|---|---|---|---|---|---|
| CN | 101160780 | B | * | 5/2010 | H04L 63/0807 |
| CN | 101939754 | A | * | 1/2011 | G06F 21/32 |
| CN | 101563696 | B | * | 3/2013 | G06F 21/606 |
| CN | 103746794 | A | * | 4/2014 | H04L 9/065 |
| CN | 112544052 | A | * | 3/2021 | H04L 63/06 |
| CN | 112640502 | A | * | 4/2021 | H04W 12/03 |
| EP | 0688929 | A2 | * | 12/1995 | H04L 9/861 |
| JP | 2002111648 | A | * | 4/2002 | G11B 20/00086 |
| JP | 4402356 | B2 | * | 1/2010 | H04L 9/0836 |
| JP | 2018148302 | A | * | 9/2018 | H04L 63/0435 |
| KR | 19980070367 | A | * | 10/1998 | H04L 9/0861 |
| KR | 20110117799 | A | * | 10/2011 | H04L 9/3242 |
| WO | WO-2019/124667 | A | | 6/2019 | |

OTHER PUBLICATIONS

EP-0688929-A2_Secure Self-Learning (Machine Translation) by Bruwer Frederick Johannes pp. 20; Dec. 1995.*

CN-101563696-B_System and Method Used for Changing Share Encrypted Secret Key (Machine Translation) by Ibrahim, W M; Wang, L; Rios, J; Ali, V Y and Novoa, M pp. 5; Mar. 2013.*

KR-20110117799-A_Method and Terminal of Preventing Parameter From Forging/Alternating (Machine Translation) by Chang Sok Ho pp. 7; Oct. 2011.*

JP-4402356-B2_Data Distribution System (Machine Translation) by Matsumoto T; pp. 57; Jan. 2010.*

European Extended Search Report for European Application No. 21197274.0 dated Feb. 10, 2022.

* cited by examiner

SECURE KEY GENERATION AND MANAGEMENT IN OPEN AND SECURE PROCESSOR ENVIRONMENTS

TECHNICAL FIELD

The present embodiments relate generally to encryption systems, and more particularly to secure encryption key generation and management in open and secure processor environments.

BACKGROUND

Embedded and portable electronic systems are increasingly complex and are exposed to increasing security risks. In addition, demands for number of use cases for and flexibility of embedded and portable computer systems are increasingly expanding. Embedded and portable computer system are increasingly requested to store, access, and manage sensitive information in a wide variety or scenarios, while also supporting open and flexible application operation. However, conventional systems may not effectively store, access, or manage sensitive data with sufficiently secure encryption on an embedded or portable electronic system in sufficiently broad use cases. Thus, a technological solution for secure encryption key generation and management in open and secure processor environments is desired.

SUMMARY

Example implementations include a method of generating a first authentication code based at least partially on an authentication key and an application key, transmitting to a secure subsystem of the local processing device the authentication key, the application key, and the first authentication code, generating, at the secure subsystem, a second authentication code based at least partially on the authentication key and the application key, and generating, at the secure subsystem, a secure application key, in accordance with a determination that the first authentication code and the second authentication code satisfy an authentication criterion.

Example implementations also include a method of obtaining an secure application key at a secure subsystem of a local processing system, obtaining, at the secure subsystem, an application key based at least partially on the secure application key, obtaining, at the secure subsystem, a first authentication code based at least partially on the secure application key, obtaining, at the secure subsystem, a device identifier key, generating, at the secure subsystem, a second authentication code based on the application key and the device identifier key, and accepting the application key in accordance with a determination that the first authentication code and the second authentication code satisfy an authentication criterion.

Example implementations also include a device with a system processor configured to generate a first authentication code based at least partially on an authentication key and an application key, and to transmit the authentication key, the application key, and the first authentication code, and a secure processor operatively coupled to the system processor and configured to receive the authentication key, the application key, and the first authentication code, to generate a second authentication code based at least partially on the authentication key and the application key, and to generate, in accordance with a determination that the first authentication code and the second authentication code satisfy an authentication criterion, a secure application key.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Figure 1:
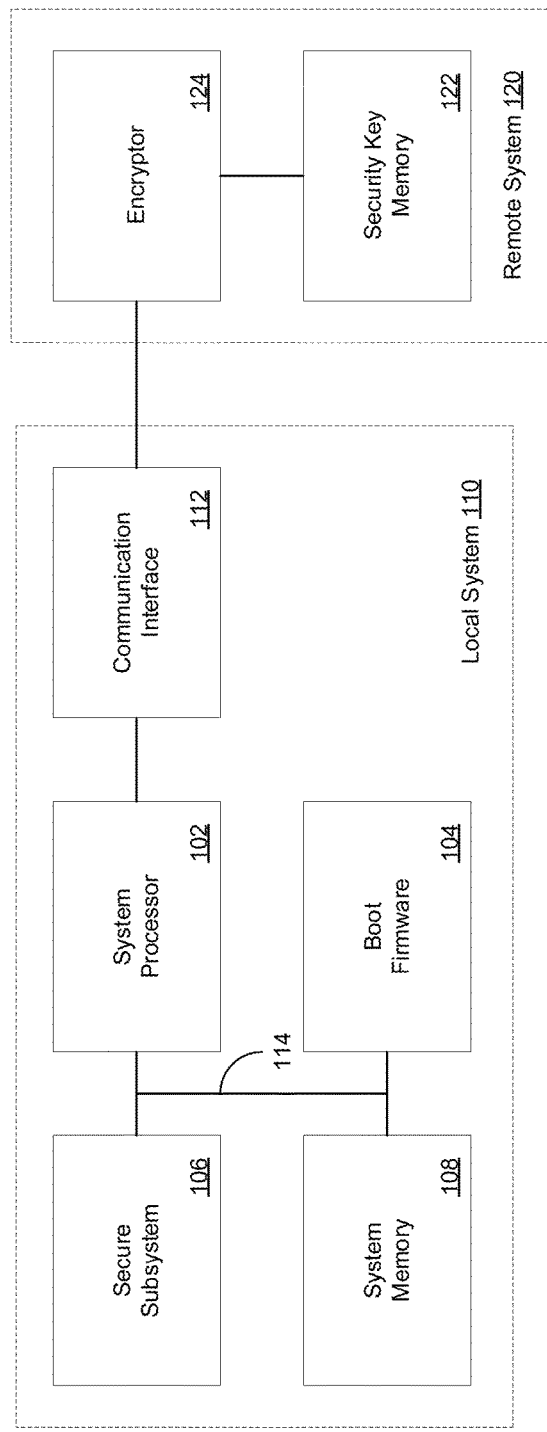
FIG. 1 illustrates an exemplary system in accordance with present implementations.

FIG. 1 illustrates an exemplary system in accordance with present implementations. As illustrated by way of example in FIG. 1, an exemplary system 100 includes at least one of a local system 110 (also termed a local processing system or a local processing device) and a remote system 120. In some implementations, the local system 110 includes a system processor 102, a boot firmware 104, a secure subsystem 106, a system memory 108, a communication interface 112, and a system bus 114. In some implementations, the local system 110 includes an electronic circuit board, printed circuit board, conductive substrate, or the like. In some implementations, the remote system 120 includes a security key memory 122 and an encryptor 124. In some implementations, the remote system 120 includes a server computer or the like operatively coupled or operatively coupleable to the local system 110 by one or more wired, wireless, digital, network, or like connections.

The system processor 102 is operable to execute one or more instructions associated with the local processing system 110. In some implementations, the system processor 102 is an electronic processor, an integrated circuit, or the like including one or more of digital logic, analog logic, digital sensors, analog sensors, communication buses, volatile memory, nonvolatile memory, and the like. In some implementations, the system processor 102 includes but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor 102 includes a memory operable to store or storing one or more instructions for operating components of the system processor 102 and operating components operably coupled to the system processor 102. In some implementations, the one or more instructions include at least one of firmware, software, operating systems, embedded operating systems, and the like. It is to be understood that the system processor 102 or the local system 110 generally can include at least one communication bus controller to effect communication between the system processor 102 and the other elements of the local system 110.

The boot firmware 104 is operable to execute one or more instructions to operate, initialize, start, restart, shut down, sleep, or the like, one or more of the local system 110, the system processor 102, the secure subsystem 106, the system memory, and the communication interface 112. In some implementations, the boot firmware includes one or more electrical, electronic, and logical devices. In some implementations, the boot firmware includes one or more integrated circuits, transistors, transistor arrays, or the like. In some implementations, the boot firmware includes one or more boot instructions, boot loaders, or the like.

The secure subsystem 106 is operable to perform processing, storage, retrieval, and the like inaccessible to one or more of the system processor 102, the boot firmware 104, the system memory 108, the communication interface 112, and the remote system 120. In some implementations, the secure subsystem includes restrictions on access to one or more memory devices, memory locations, memory addresses and the like. In some implementations, the secure subsystem includes restrictions on access to one or more processing devices, processing functions, and the like. In some implementations, the secure subsystem stores or is operable to store information received at the local system by the communication interface. As one example, the secure subsystem can store passwords, financial information, encryption keys, user identification information, security tokens, and the like. In some implementations, the secure subsystem stores or is operable to store immutable data. In some implementations, immutable data cannot be changed once written. As one example, immutable data includes, but is not limited to, device identifiers, unique keys associated with the local system 110, unique key indices associated with the local system 110, key generation seeds, key generation instructions, and the like. Thus, in some implementations, the secure subsystem 106 can perform one or more functions inaccessible to any device or system outside of the secure subsystem.

The system memory 108 is operable to store data associated with the local system 110. In some implementations, the system memory 108 includes ones or more hardware memory devices for storing binary data, digital data, or the like. In some implementations, the system memory 108 includes one or more electrical components, electronic components, programmable electronic components, reprogrammable electronic components, integrated circuits, semiconductor devices, flip flops, arithmetic units, or the like. In some implementations, the system memory 108 includes at least one of a non-volatile memory device, a solid-state memory device, a flash memory device, and a NAND memory device. In some implementations, the system memory 108 includes one or more addressable memory regions disposed on one or more physical memory arrays. In some implementations, a physical memory array includes a NAND gate array disposed on a particular semiconductor device, integrated circuit device, printed circuit board device, and the like.

The communication interface 112 is operable to communicatively couple the local system 110 to the remote system 120. In some implementations, the communication interface 112 includes one or more network interface devices, channels, and the like. In some implementations, the communication interface includes an Internet communication interface or is operably coupleable to an Internet communication interface by one or more external devices, systems, or the like. The system bus 114 is operable to communicate one or more instructions, signals, conditions, states, or the like between one or more of the system processor 102, the boot firmware 104, the system memory 108, the communication interface 112, and the remote system 120. In some implementations, the system bus 114 includes one or more digital, analog, or like communication channels, lines, traces, or the like.

The security key memory 122 is operable to store and retrieve one or more security keys associated with the local system 110. In some implementations, the security key memory includes one or more devices in accordance with the system memory 108. In some implementations, the security key memory 122 includes one or more magnetic, optical, tape, solid-state disks or disk arrays. In some implementations, the security key memory 122 includes or is a write-once, non-rewriteable, or like memory device.

The encryptor 124 is operable to execute one or more instructions to generate an encrypted or decrypted data object, is operable to transform an encrypted data object into a decrypted data object, and is operable to transform a decrypted data object into an encrypted data object. As one example, data object includes a binary or text file, string, or the like. In some implementations, the encryptor 124 includes one or more instructions for encrypting one or more data objects in accordance with a predetermined encryption method, process, or the like. As one example, an encryption method includes a method for generating a symmetric encryption key, a method for generating an asymmetric encryption key, a method for validating an encryption key, a method for encrypting data with an encryption key, and a method for decrypting data with an encryption key. In some implementations, a predetermined encryption method is immutably written to the encryptor 124 at time of manufacturing the local processing device 110. In some implementations, the encryptor 124 includes one or more logical or electronic devices including but not limited to integrated circuits, logic gates, flip flops, gate arrays, programmable gate arrays, and the like.

Figure 2:
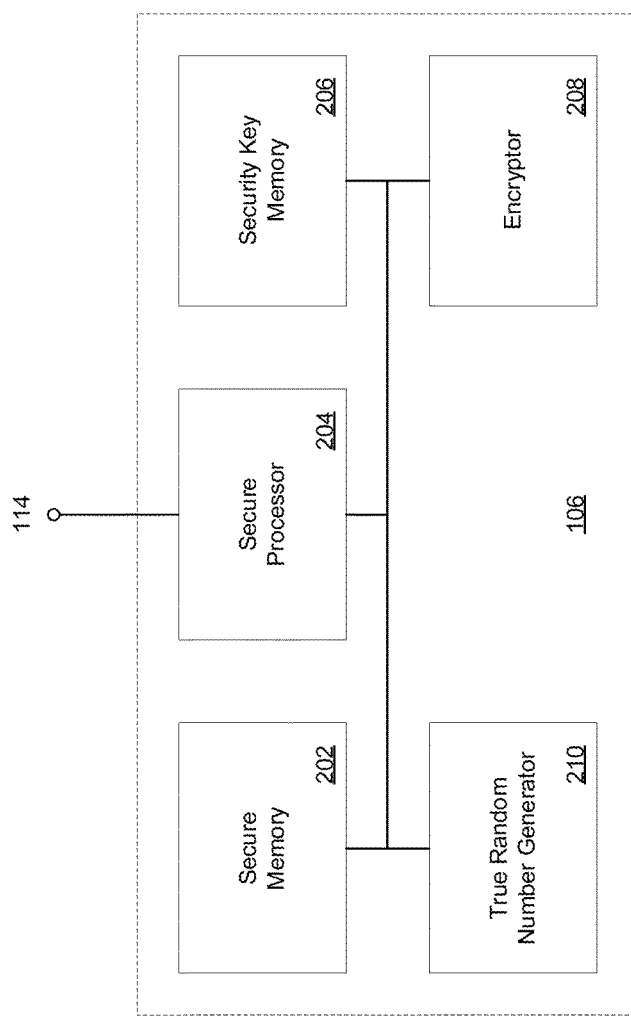
FIG. 2 illustrates an exemplary secure subsystem in accordance with the exemplary system of FIG. 1.

FIG. 2 illustrates an exemplary secure subsystem in accordance with the exemplary system of FIG. 1. As illustrated by way of example in FIG. 2, an exemplary secure subsystem 200 includes a secure memory 202, a secure processor 204, a security key memory 206, an encryptor 208, and a true random number generator 210. In some implementations, the secure subsystem 106 includes the exemplary secure subsystem 200.

The secure memory 202 is operable to store data associated with the secure subsystem 200. In some implementations, the secure subsystem 200 limits or prevents access to at least a portion of the secure memory 202 from the local processing system 110. In some implementations, the secure subsystem 200 limits or prevents direct addressing of at least a portion of the secure memory 202 from the local processing system 110. In some implementations, the secure memory 202 includes ones or more hardware memory devices for storing binary data, digital data, or the like. In some implementations, the secure memory 202 includes one or more electrical components, electronic components, programmable electronic components, reprogrammable electronic components, integrated circuits, semiconductor devices, flip flops, arithmetic units, or the like. In some implementations, the secure memory 202 includes at least one of a non-volatile memory device, a solid-state memory device, a flash memory device, and a NAND memory device. In some implementations, the secure memory 202 includes one or more addressable memory regions disposed on one or more physical memory arrays. In some implementations, a physical memory array includes a NAND gate array disposed on a particular semiconductor device, integrated circuit device, printed circuit board device, and the like.

The secure processor 204 is operable to execute one or more instructions associated with the secure subsystem 200. In some implementations, the secure processor 204 limits or prevents access to at least a portion of the secure memory 202 from the local processing system 110. In some implementations, the secure processor 204 limits or prevents direct addressing of at least a portion of the secure memory 202 from the local processing system 110. In some implementations, the secure processor 204 is operable to perform one or more processing operations associated with restricted or preventing access to the secure subsystem 200. In some implementations, the secure processor is operatively coupled to the system bus 114. In some implementations, the secure processor 204 includes one or more devices in accordance with the system processor 102.

The security key memory 206 is operable to store and retrieve one or more security keys associated with the local processing system 110. In some implementations, the security key memory 206 includes one or more devices in accordance with the system memory 108. In some implementations, the security key memory 206 is integrated with the secure memory 202. In some implementations, the security key memory 206 is a physical or logical portion of the secure memory 206. In some implementations, the security key memory 206 includes or is a write-once, non-rewriteable, or like memory device.

The encryptor 208 is operable to execute one or more instructions to generate an encrypted or decrypted data object, is operable to transform an encrypted data object into a decrypted data object, and is operable to transform a decrypted data object into an encrypted data object. In some implementations, the encryptor 208 includes one or more devices in accordance with the encryptor 124. The true random number generator 210 is operable to generate one or more true random numbers, pseudorandom numbers, or the like. In some implementations, the true random number generator is integrated with the secure processor 204. In some implementations, the true random number generator 210 includes one or more logical or electronic devices including but not limited to integrated circuits, logic gates, flip flops, gate arrays, programmable gate arrays, and the like.

Figure 3:
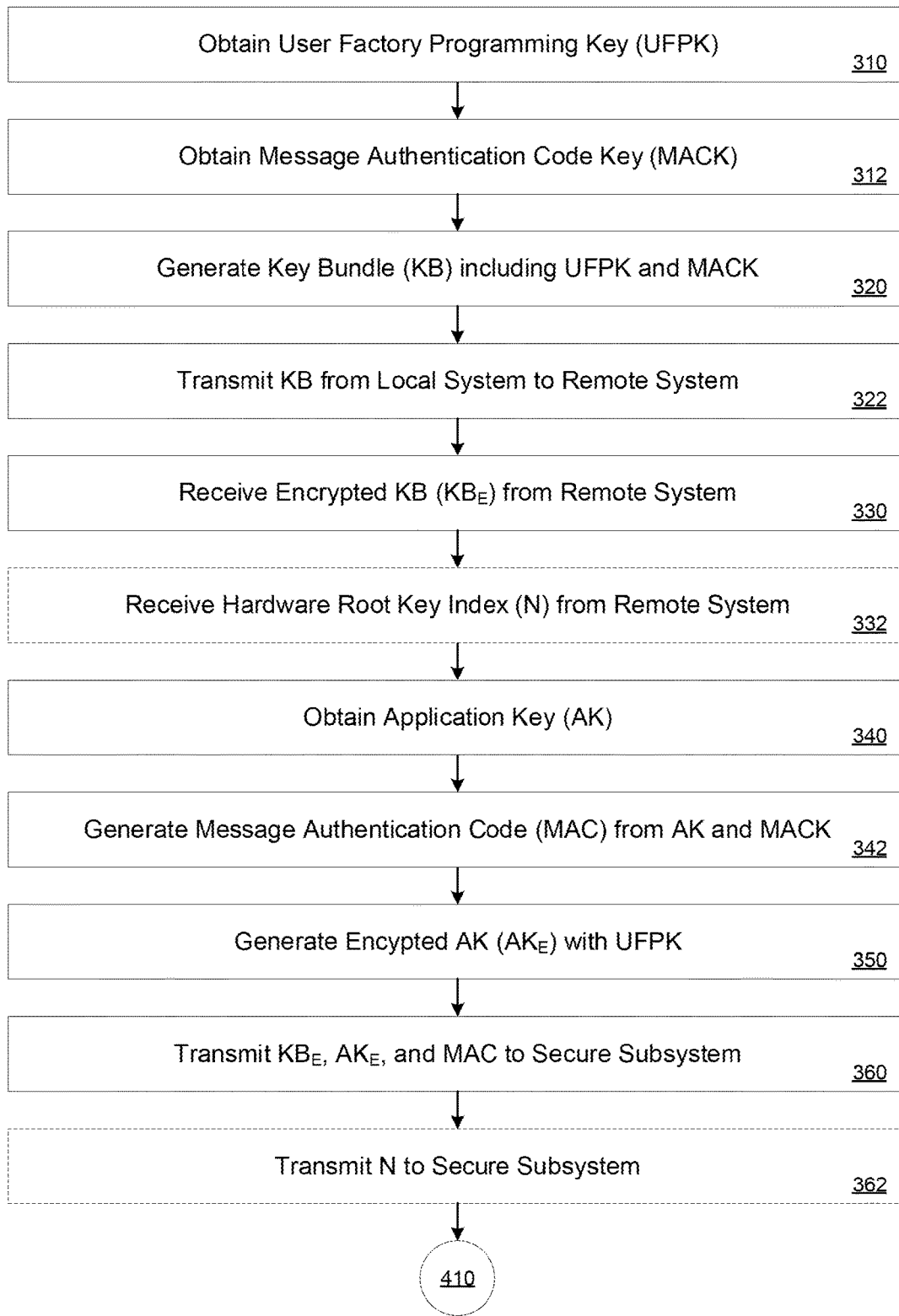
FIG. 3 illustrates an exemplary method of generating a secure application key at a local system in accordance with present implementations.

FIG. 3 illustrates an exemplary method of generating a secure application key at a local system in accordance with present implementations. In some implementations, the exemplary system 100 performs method 300 according to present implementations. In some implementations, the method 300 begins at step 310.

At step 310, an exemplary system obtains a user factory programming key UFPK. In some implementations, the UFPK is stored in and obtained from the system memory 108. In some implementations, the UFPK is operable to encrypt user data, application data, user keys, application keys, and the like. In some implementations, the UFPK is stored in the system memory 108 as part of a manufacturing process for, manufacturer installation process for, or the like, the local processing system 110. Alternatively, in some implementations, the UFPK is transferred to the local processing system 110 outside of manufacturing of the local processing system. In some implementations, the UFPK is unique to the local processing device 110 or any component thereof. In some implementations, the UFPK is not unique to the local processing device 110 and is associated with an aspect or component thereof. As one example, a non-unique UFPK can be associated with a local processing system 110 of a particular series, model, group, or the like. The method 300 then continues to step 312.

At step 312, the exemplary system obtains a message authentication code key MACK (also termed an authentication key). In some implementations, the MACK is stored in and obtained from the system memory 108. In some implementations, the MACK is operable to securely generate at least one message authentication code (also termed authentication code), and the like. In some implementations, the MACK is stored in the system memory 108 as part of a manufacturing process for, manufacturer installation process for, or the like, the local processing system 110. Alternatively, in some implementations, the MACK is transferred to the local processing system 110 outside of manufacturing of the local processing system. As one example, the MACK can be transferred to the local processing system during a refurbishing process or the like. In some implementations, the MACK is unique to the local processing device 110 or any component thereof. In some implementations, the MACK is not unique to the local processing device 110 and is associated with an aspect or component thereof. As one example, a non-unique MACK can be associated with a local processing system 110 of a particular series, model, group, or the like. The method 300 then continues to step 320.

At step 320, the exemplary system generates a key bundle KB including the UFPK and the MACK. In some implementations, the KB is or includes a wrapper, group, or the like including the UFPK and the MACK. In some implementations, the KB is a distinct data object, container, or the like, including the UFPK and the MACK. As one example, the KB can be a JSON object or the like. Alternatively, in some implementations, the KB is an index, address, reference, or the like associated with the UFPK and the MACK. It is to be understood that the KB can include additional data, objects, and the like. It is to be further understood that the UFPK and the MACK can be individually bundled in distinct key bundles. It is to be further understood that the exemplary system can optionally generate the KB. The method 300 then continues to step 322.

At step 322, the exemplary system transmits the KB from the local system to the remote system. In some implementations, the exemplary system transmits the KB from the local system 110 to the remote system 120 by the communication interface 112. In some implementations, the exemplary system transmits the KB to the remote system 120 by an encrypted, secure, or like communication channel, interface, or the like. It is to be understood that the exemplary system can transmit a plurality of key bundles to the remote system 120, and can transmit the KB to the remote system 120 in packetized format or the like. It is to be further understood that the exemplary system can optionally transmit the KB, and can transmit the UFPK and the MACK to the remote system 120. The method 300 then continues to step 330. At step 330, the exemplary system receives an encrypted key bundle $KB_E$ at the local system 110 from the remote system 120. In some implementations, the exemplary system receives the KB at the local system 110 from the remote system 120 by the communication interface 112. In some implementations, the exemplary system receives the KB from the remote system 120 by an encrypted, secure, or like communication channel, interface, or the like. It is to be understood that the exemplary system can receive a plurality of key bundles at the local system 110 from the remote system 120, and can receive the $KB_E$ from the remote system 120 in packetized format or the like. It is to be further understood that the exemplary system can optionally receive the $KB_E$, and can receive the $UFPK_E$ and the MACKE from the remote system 120 without the $KB_E$ or any key bundle or key bundles. The method 300 then continues to step 332.

At step 332, the exemplary system receives a hardware root key index N at the local system from the remote system. In some implementations, the hardware root key index identifies one or a plurality of available hardware root keys at the local system 110. In some implementations, the security key memory 206 stores one or more immutable hardware root keys. In some implementations, the security key memory 206 stores a plurality of hardware root keys in an array or the like, including an index identifier. In some implementations, the hardware root key index N identifies an array or like index associated with one of a plurality of hardware root keys at the security key memory 206 or the local processing system 110. The method 300 then continues to step 340.

At step 340, the exemplary system obtains an application key AK. In some implementations, the AK is stored in and obtained from the system memory 108. In some implementations, the AK is associated with at least one user application, user program, user data object, or the like. In some implementations, the AK is stored in the system memory 108 as part of a manufacturing process for, manufacturer installation process for, or the like, the local processing system 110. Alternatively, in some implementations, the AK is transferred to the local processing system 110 outside of manufacturing of the local processing system. In some implementations, the AK is unique to a user application, user program, user data object, or the like. In some implementations, the AK is not unique to a user application, user program, user data object, or the like and is associated with a plurality thereof. As one example, a non-unique AK can be associated with a plurality of applications, application programming interfaces, or the like, or any combination thereof. The method 300 then continues to step 342.

At step 342, the exemplary system generates a message authentication code MAC based at least partially on the AK and the MACK. In some implementations, at least one of the secure processor 204 and the encryptor 208 generates the MAC. The method 300 then continues to step 350. At step 350, the exemplary system generates an encrypted application key $AK_E$ based at least partially on the UFPK. In some implementations, at least one of the secure processor 204 and the encryptor 208 generates the $AK_E$. The method 300 then continues to step 360.

At step 360, the exemplary system transmits the $KB_E$, the $AK_E$, and the MAC from the local system to the secure subsystem. In some implementations, the system processor 102 transmits one or more of the $KB_E$, the $AK_E$, and the MAC to the boot firmware 104, and the boot firmware 104 transmits one or more of the $KB_E$, the $AK_E$, and the MAC to the secure subsystem 106. Alternatively, in some implementations, the system processor 102 transmits one or more of the $KB_E$, the $AK_E$, and the MAC directly to the secure subsystem 106. In some implementations, at least one of the secure memory 202 and the secure processor 204 receives one or more of the $KB_E$, the $AK_E$, and the MAC. The method 300 then continues to step 362. At step 362, the exemplary system transmits the index N from the local system to the secure subsystem. It is to be understood that the exemplary system optionally transmits the index N in response to optionally receiving the index N from the remote system 120. In some implementations, the system processor 102 transmits the index N to the boot firmware 104, and the boot firmware 104 transmits the index N to the secure subsystem 106. Alternatively, in some implementations, the system processor 102 transmits the index N directly to the secure subsystem 106. In some implementations, at least one of the secure memory 202 and the secure processor 204 receives one or more of the $KB_E$, the $AK_E$, and the MAC. In some implementations, the method 300 then continues to step 410.

Figure 4:
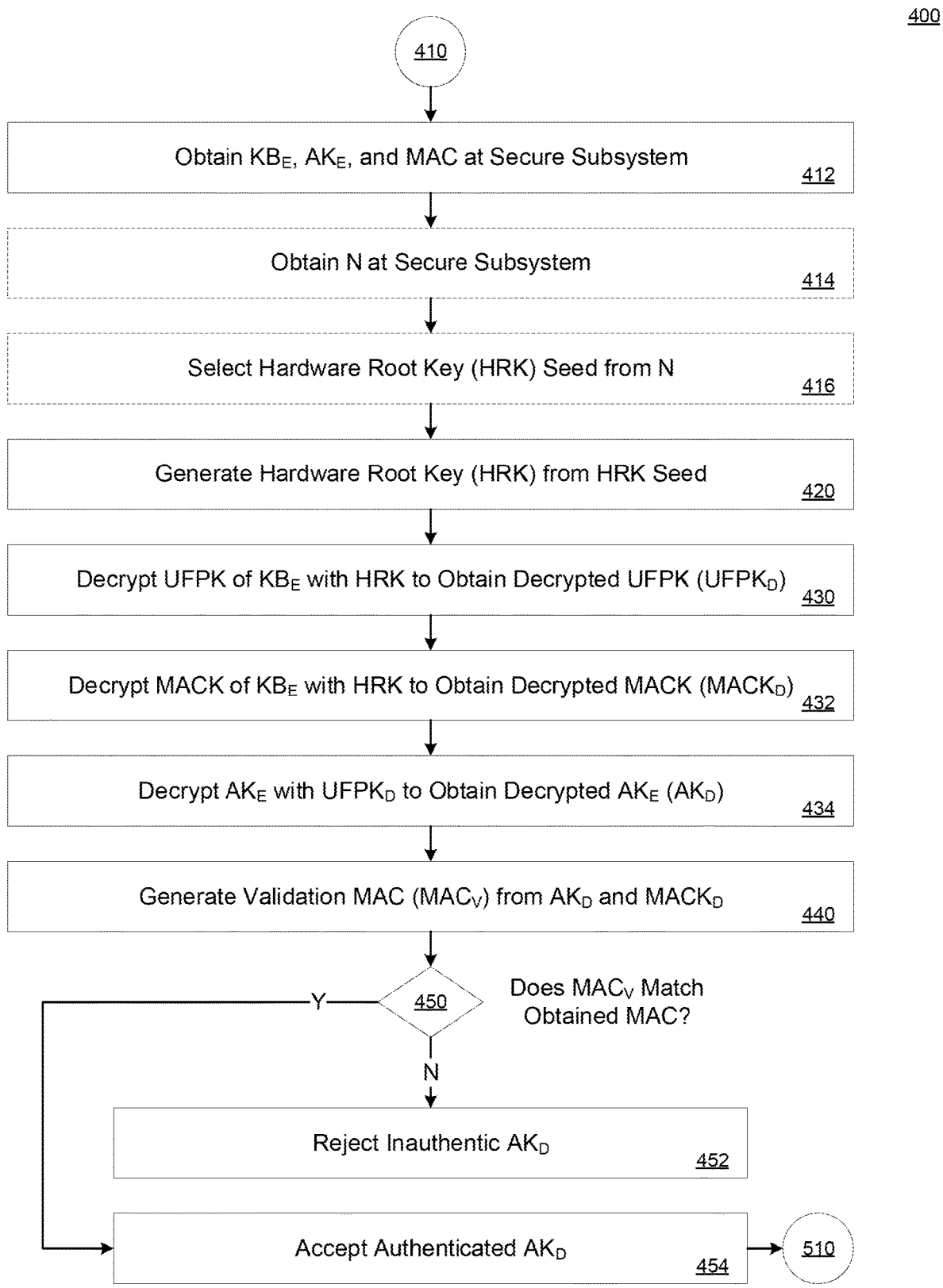
FIG. 4 illustrates an exemplary method of generating a secure application key at a secure subsystem of a local system, further to the exemplary method of FIG. 3.

FIG. 4 illustrates an exemplary method of generating a secure application key at a secure subsystem of a local system, further to the exemplary method of FIG. 3. In some implementations, the exemplary system 100 performs method 400 according to present implementations. In some implementations, the method 400 begins at step 410. The method 400 then continues to step 412.

At step 412, the exemplary system obtains the $KB_E$, the $AK_E$, and the MAC at the secure subsystem. In some implementations, at least one of the secure memory 202 and the secure processor 204 obtains at least one of the $KB_E$, the $AK_E$, and the MAC. The method 400 then continues to step 414.

At step 414, the exemplary system obtains the index N at the secure subsystem. In some implementations, at least one of the secure memory 202 and the secure processor 204 obtains the index N. It is to be understood that the exemplary system optionally obtains the index N at the secure subsystem 106 in response to optionally receiving the index N from the remote system 120. The method 400 then continues to step 416. At step 416, the exemplary system selects a hardware root key seed based at least partially on the index N. In some implementations, the secure processor 204 selects the hardware root key seed from at least one of the secure memory 202 and the security key memory 206. In some implementations, the hardware root key seed is one of a plurality of hardware root key seeds in an array or the like. In some implementations, the exemplary system selects the hardware root key seed by selecting a hardware root key seed at an index corresponding to the index N, from an array of hardware root key seeds. It is to be understood that the exemplary system optionally selects a hardware root key seed based at least partially on the index N at the secure subsystem 106 in response to optionally receiving the index N from the remote system 120. The method 400 then continues to step 420.

At step 420, the exemplary system generates a hardware root key HRK based at least partially on the hardware root key seed. In some implementations, at least one of the secure processor 204 and the encryptor 208 generates a hardware root key HRK. The method 400 then continues to step 430.

At step 430, the exemplary system decrypts the UFPK of the $KB_E$ to obtain a decrypted user factory programming key $UFPK_D$. In some implementations, the exemplary system decrypts the UFPK of the $KB_E$ based at least in part on the HRK to obtain a decrypted user factory programming key $UFPK_D$. In some implementations, at least one of the secure processor 204 and the encryptor 208 decrypts the UFPK of the $KB_E$. In some implementations, the exemplary system decrypts the $KB_E$ container to obtain the $UFPK_D$. Alternatively, the exemplary system directly decrypts an encrypted UFPK to obtain the $UFPK_D$ in response to receiving a UFPK directly encrypted within an unencrypted key bundle, or directly receiving an encrypted UFPK without a key bundle. The method 400 then continues to step 432.

At step 432, the exemplary system decrypts the MACK of the $KB_E$ to obtain a decrypted message authentication code key $MACK_D$. In some implementations, at least one of the secure processor 204 and the encryptor 208 decrypts the MACK of the $KB_E$. In some implementations, the exemplary system decrypts the $KB_E$ container to obtain the $MACK_D$. Alternatively, the exemplary system directly decrypts an encrypted MACK to obtain the $MACK_D$ in response to receiving a MACK directly encrypted within an unencrypted key bundle, or directly receiving an encrypted MACK without a key bundle. The method 400 then continues to step 434. At step 434, the exemplary system decrypts the $AK_E$ with the $UFPK_D$ to obtain a decrypted application key $AK_D$. In some implementations, at least one of the secure processor 204 and the encryptor 208 decrypts the $AK_D$. The method 400 then continues to step 440.

At step 440, the exemplary system generates a validation message authentication code $MAC_V$ based at least partially on the $AK_D$ and the $MACK_D$. In some implementations, at least one of the secure processor 204 and the encryptor 208 generates the $MAC_V$. The method 400 then continues to step 450.

At step 450, the exemplary system determines whether the $MAC_V$ matches the MAC. In some implementations, at least one of the secure processor 204 and the encryptor 208 determines whether the $MAC_V$ matches the MAC. In some implementations, the $MAC_V$ and the MAC are strings, and the determination includes determining differences between the $MAC_V$ and the MAC. Alternatively the determination including matching a hash of the MACV with a hash of the MAC. It is to be understood that the exemplary system can match according to other alternative methods of matching in accordance with present implementations. In accordance with a determination that the $MAC_V$ matches the MAC, the method 400 then continues to step 452. Alternatively, in accordance with a determination that the $MAC_V$ does not match the MAC, the method 400 then continues to step 454.

At step 452, the exemplary system rejects the $AK_D$ as inauthentic. In some implementations, the secure processor 204 deletes, removes, marks, identifies, or the like, the rejected inauthentic $AK_D$. In some implementations, the method 400 ends at step 452. At step 454, the exemplary system accepts the $AK_D$ as authentic. In some implementations, the secure processor 204 saves, records, marks, identifies, or the like, the accepted authentic $AK_D$. In some implementations, the method 400 then continues to step 510.

Figure 5:
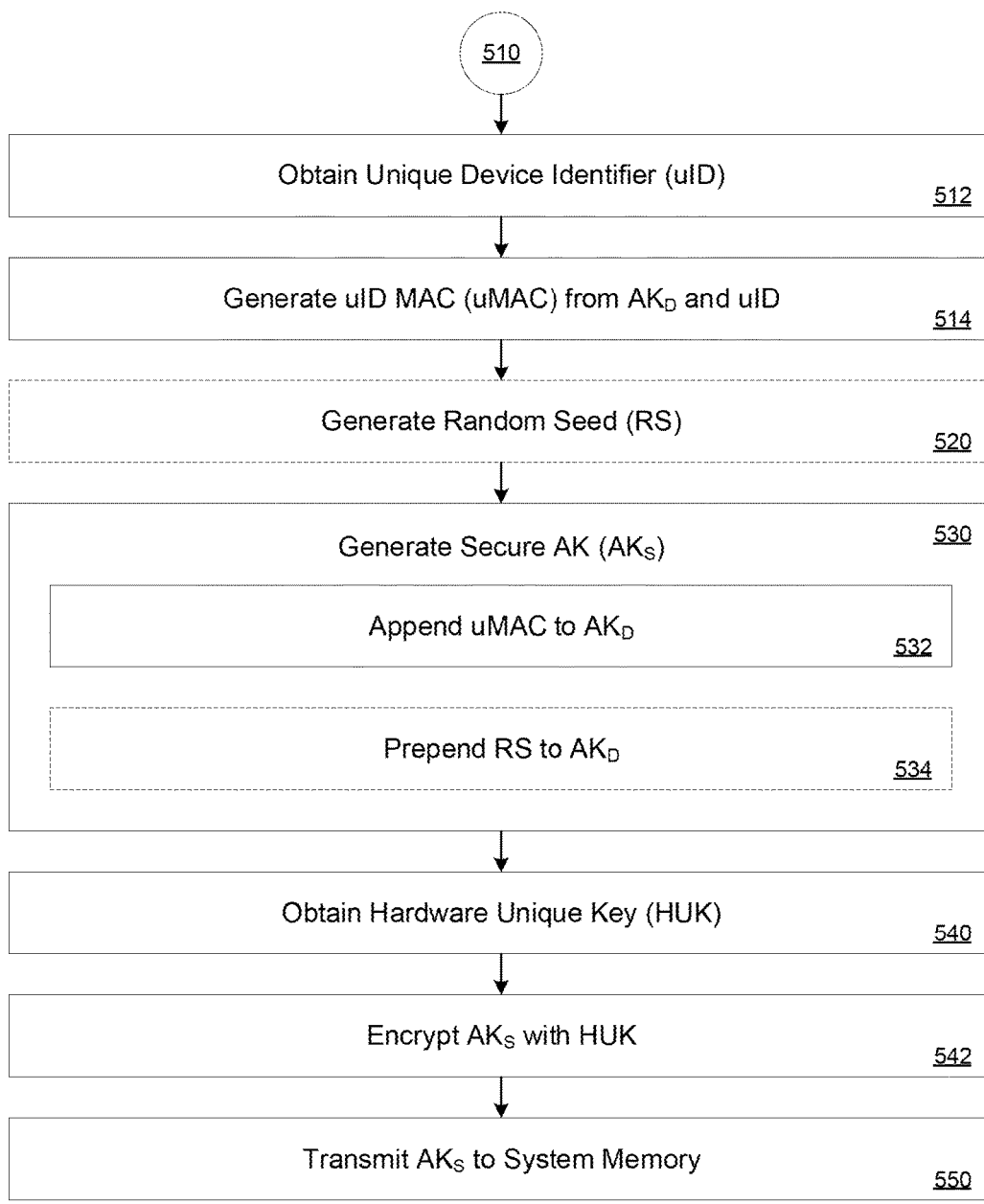
FIG. 5 illustrates an exemplary method of generating a secure application key associated with a local system, further to the exemplary method of FIG. 4.

FIG. 5 illustrates an exemplary method of generating a secure application key associated with a local system, further to the exemplary method of FIG. 4. In some implementations, the exemplary system 100 performs method 500 according to present implementations. In some implementations, the method 500 begins at step 510. The method 500 then continues to step 512.

At step 512, the exemplary system obtains a unique device identifier uID. In some implementations, the system processor 102 obtains the uID from the system memory 108. In some implementations, the uID is stored at the system memory 108. The method 500 then continues to step 514.

At step 514, the exemplary system generates a unique message authentication code uMAC associated with the uID. In some implementations, at least one of the secure processor 204 and the encryptor 208 generates the uMAC. In some implementations, the exemplary system generates the uMAC based on the uID and the authenticated $AK_D$. The method 500 then continues to step 520. At step 520, the exemplary system generates a random seed RS. In some implementations, the RS is or includes a character string. In some implementations, the exemplary system optionally generates the RS in response to a selection, determination, setting, flag, or the like. In some implementations, the exemplary system optional generates the RS based on receiving user input at one or more of the secure processor 204 and the system processor 102. The method 500 then continues to step 530.

At step 530, the exemplary system generates a secure application key AKs. In some implementations, at least one of the secure processor 204 and the encryptor 208 generates the AKs. In some implementations, step 530 includes one or more of step 532 and 534. At step 532, the exemplary system appends the uMAC to the $AK_D$. It is to be understood that the exemplary system can combine the uMAC with the $AK_D$ by any string or data aggregation process. At step 534, the exemplary system prepends the RS to the $AK_D$. It is to be understood that the exemplary system can optionally combine the RS with the $AK_D$ by any string or data aggregation process. The method 500 then continues to step 540.

At step 540, the exemplary system obtains a hardware unique key HUK. In some implementations, at least one of the secure processor 204 and the encryptor 208 obtains the HUK from at least one of the secure memory 202 and the security key memory 206. In some implementations, the security key memory 206 is associated with or uniquely associated with the local processing system 110. In some implementations, the security key memory 206 is associated with or uniquely associated with the secure subsystem 106. In some implementations, the security key memory 206 immutably stores the HUK thereon or therewith. The method 500 then continues to step 542. At step 542, the exemplary system encrypts the AKs with the HUK. In some implementations, the encrypted AKs includes the RS in order to increase difficulty of decrypting the AKs without the HUK, by increasing the size of the decryption problem computationally. Thus, the exemplary system can technologically limit computational devices with quantifiable computational resources from decrypting the AKs without the HUK by including the RS with the AKs. The method 500 then continues to step 550. It is to be understood that in some implementations, the exemplary system can perform steps 540, 542, and 550 independently of any uID. Further, it is to be understood that in such implementations, the AKs can be the $AK_D$. Thus, in some implementations, the example system continues from step 510 directly to step 540.

At step 550, the exemplary system transmits the AKs to a system memory of the local processing system. In some implementations, the secure processor 204 transmits the AKs to the system memory 108 by the system bus 114. Thus, the AKs can be stored outside of the secure subsystem 106 under HUK encryption associated with or uniquely associated with the secure subsystem 106. As one example, it is advantageous to store the AKs at the system memory 108 if the secure memory 202 is of limited size compared to the system memory 108. As another example, it is advantageous to store the AKs at the system memory to allow one or more programs, applications, instructions, or the like, to request one or more actions from the secure subsystem 106 based on the AKs. In some implementations, the method 500 ends at step 550.

Figure 6:
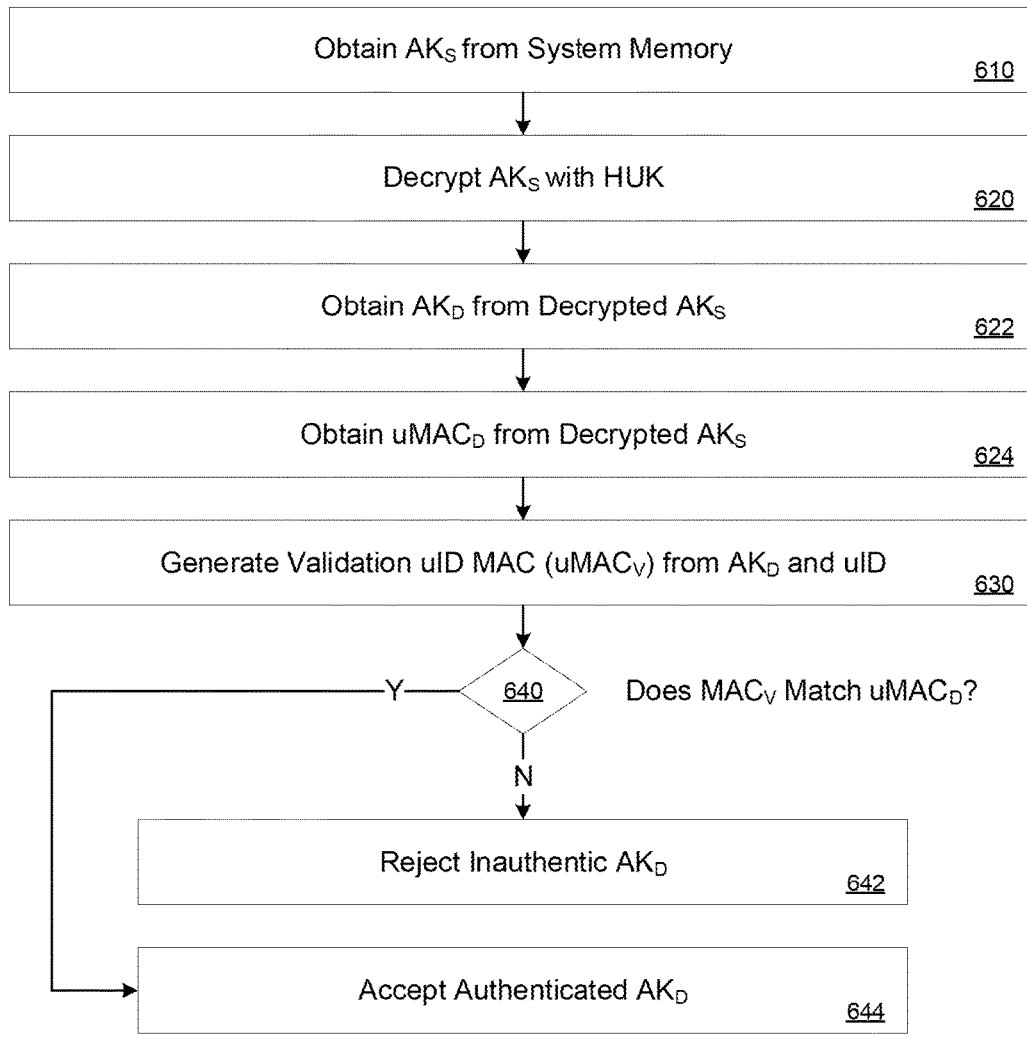
FIG. 6 illustrates an exemplary method of authenticating a secure application key in accordance with present implementations.

FIG. 6 illustrates an exemplary method of authenticating a secure application key in accordance with present implementations. In some implementations, the exemplary system 100 performs method 600 according to present implementations. In some implementations, the method 600 begins at step 610.

At step 610, the exemplary system obtains the AKs from the system memory. In some implementations, the secure processor 204 obtains the AKS from the system memory 108 by the system bus 114. The method 600 then continues to step 620.

At step 620, the exemplary system decrypts the AKs with the HUK. In some implementations, at least one of the secure processor 204 and the encryptor 208 decrypts the AKs. In some implementations, at least one of the secure processor 204 and the encryptor 208 decrypts the AKs with the HUK stored by at least one of the security key memory 206 and the secure memory 202. In some implementations, that exemplary system decrypts the AKs to generate, obtain, or the like, one or more data objects. In some implementations, the obtained data objects include one or more of an application key, a message authentication code, and a random seed. It is to be understood that in some implementations, the example system can end operation on an unsuccessful decryption attempt. In some implementations, an unsuccessful decryption attempt includes at least one of a decryption attempt using a corrupted HUK. In some implementations, an unsuccessful decryption attempt includes at least one of a decryption attempt using a HUK associated with a system other than the example system. In some implementations, an unsuccessful decryption attempt includes at least one of a decryption attempt using a HUK including inauthentic, malicious, or like components, portions, or the like. Thus, in some implementations, the method ends at step 620. Alternatively, in some implementations, the method 600 then continues to step 622.

At step 622, the exemplary system obtains a decrypted application key $AK_D$ from the decrypted AKs. In some implementations, at least one of the secure processor 204 and the encryptor 208 obtains the $AK_D$. The method 600 then continues to step 624. At step 624, the exemplary system obtains a decrypted unique message authentication code $uMAC_D$ from the decrypted AKs. In some implementations, at least one of the secure processor 204 and the encryptor 208 obtains the $uMAC_D$. The method 600 then continues to step 630.

At step 630, the exemplary system generates a unique validation message authentication code $uMAC_V$ based at least partially on the $AK_D$ and the uID. In some implementations, at least one of the secure processor 204 and the encryptor 208 generates the $uMAC_V$. The method 600 then continues to step 640.

At step 640, the exemplary system determines whether the $MAC_V$ matches the MAC. In some implementations, at least one of the secure processor 204 and the encryptor 208 makes the determination. In some implementations, the exemplary system performs step 640 in accordance with step 450. In accordance with a determination that the $MAC_V$ matches the MAC, the method 600 then continues to step 642. Alternatively, in accordance with a determination that the $MAC_V$ does not match the MAC, the method 600 then continues to step 644. At step 642, the exemplary system rejects the $AK_D$ as inauthentic. In some implementations, the exemplary system performs step 642 in accordance with step 452. In some implementations, the method 600 ends at step 642. At step 644, the exemplary system accepts the $AK_D$ as authentic. In some implementations, the exemplary system performs step 644 in accordance with step 454. In some implementations, the method 600 ends at step 644.

Figure 7:
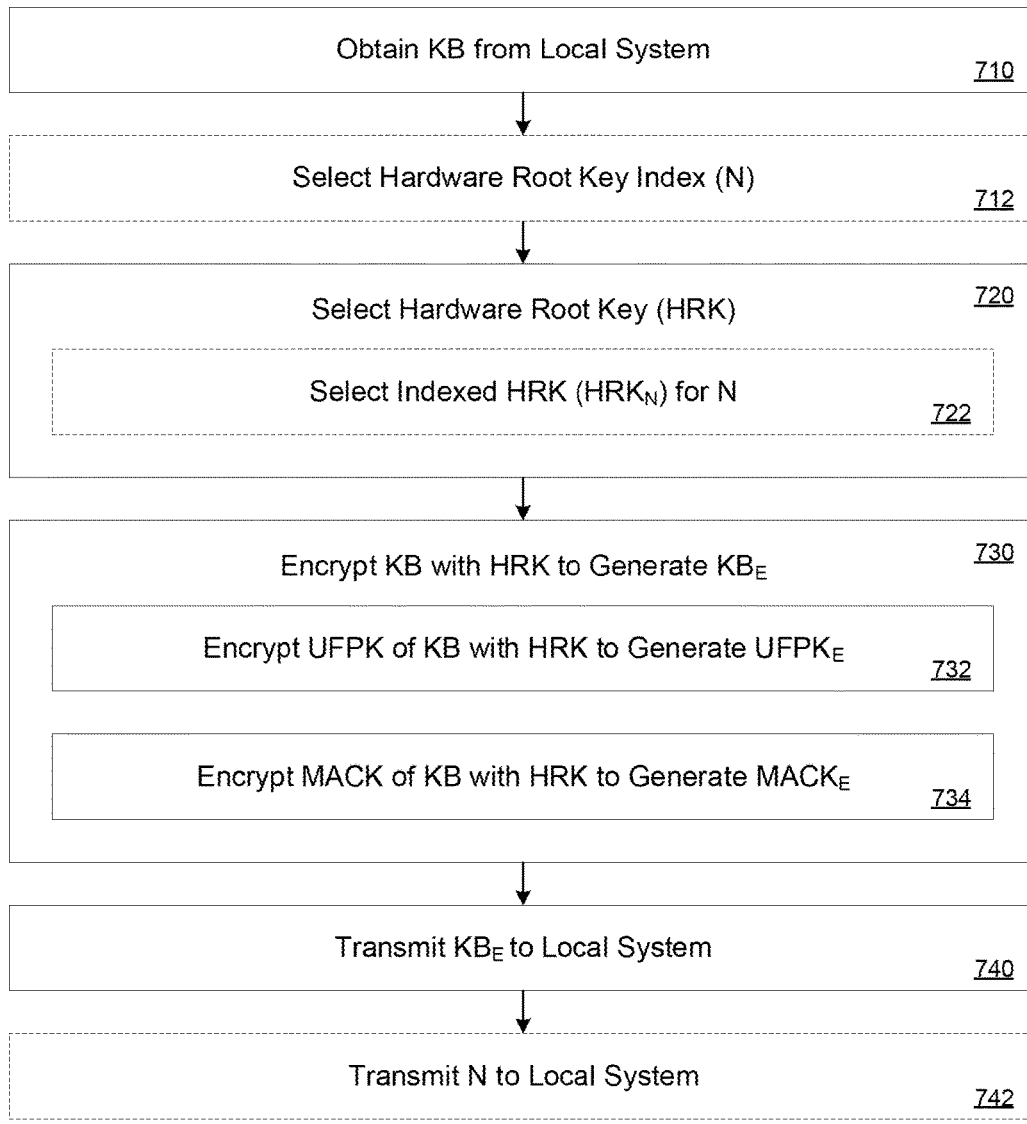
FIG. 7 illustrates an exemplary method of generating a secure application key at a remote system in accordance with present implementations.

FIG. 7 illustrates an exemplary method of generating a secure application key at a remote system in accordance with present implementations. In some implementations, the exemplary system 100 performs method 700 according to present implementations. In some implementations, the method 700 begins at step 710.

At step 710, the exemplary system obtains the key bundle KB from the local system. In some implementations, the encryptor 124 obtains the KB from the communication interface 112 of the local system 110. It is to be understood that the remote system 120 can include at least one communication interface in accordance with or compatible with the communication interface 112. It is to be further understood that the encryptor 124 can receive the KB and any other communication from the local system 110 and others indirectly through a communication interface thereof, or device intervening between the remote system 120 and the local system 110. In some implementations, the communication interface is or includes a secure communication interface. As one example, the secure communication interface is or includes is a PGP encrypted data exchange over a secure https connection. The method 700 then continues to step 712.

At step 712, the exemplary system selects a hardware root key index N. In some implementations, the encryptor 124 selects the hardware root key index N. In some implementations, the security key memory 122 stores one or more hardware keys matching to, corresponding to, or the like, one or more hardware keys stored on the local system 110. In some implementations, the security key memory 122 stores an array or the like of a plurality of hardware keys stored matching to, corresponding to, or the like, an array or the like of a plurality of hardware keys stored on the local system 110. In some implementations, the security key memory immutable stores one or more hardware keys or hardware key arrays associated with the security key memory. Thus, the remote system 120 and the local system 110 can perform encryption and decryption operations without transmitting any hardware root key therebetween. The method 700 then continues to step 720. At step 720, the exemplary system selects a hardware root key HRK. In some implementations, the encryptor 124 selects a hardware root key associated with the local system 110. In some implementations, step 720 includes step 722. At step 722, the exemplary system selects an indexed hardware root key associated with the index N. It is to be understood that the exemplary system can optionally select the indexed hardware root key for a local system optionally having stored thereon a plurality of hardware root keys indexable by N. The method 700 then continues to step 730.

At step 730, the exemplary system encrypts the KB with the selected HRK to generate an encrypted key bundle KBE. In some implementations, step 730 includes one or more of step 732 and 734. At step 732, the exemplary system encrypts the user factory programming key UFPK with the HRK to generate an encrypted user factory programming key UFPK$_E$. In some implementations, the UFPK is embedded in, wrapped in, associated with, or the like, the KB. In some implementations, the KB including the UFPK is encrypted. Alternatively, in some implementations, the UFPK is directly encrypted. It is to be understood that the UFPK can be encrypted with or without the KB in any manner compatible with the local system 110 and step 330. At step 734, the exemplary system encrypts the message authentication code key MACK with the HRK to generate an encrypted message authentication code key MACKE. In some implementations, the MACK is embedded in, wrapped in, associated with, or the like, the KB. In some implementations, the KB including the MACK is encrypted. Alternatively, in some implementations, the MACK is directly encrypted. It is to be understood that the MACK can be encrypted with or without the KB in any manner compatible with the local system 110 and step 330. The method 700 then continues to step 740.

At step 740, the exemplary system transmits the KB$_E$ to the local system. In some implementations, the encryptor 124 transmits the KB$_E$ to the communication interface 112 of the local system 110. In some implementations, the exemplary system transmits the KB$_E$ correspondingly to obtaining the KB at step 710. In some implementations, the method 700 ends at step 740. Alternatively, in some implementations, the method then continues to step 742. At step 742, the exemplary system transmits the index N to the local system. It is to be understood that the exemplary system can optionally transmit the index N in accordance with one or more of steps 332 and 722. In some implementations, the method 700 ends at step 742.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method executable on a local processing system including a secure subsystem, the method comprising:
   generating, by the local processing system via a system processor, a first authentication code based at least partially on a message authentication code key and an application key;
   transmitting, by the local processing system via the system processor, to a secure subsystem of the local processing system the message authentication code key, the application key, and the first authentication code;
   generating, by the secure subsystem via a secure processor, a second authentication code based at least partially on the message authentication code key and the application key;
   determining, by the secure subsystem via the secure processor, that the second authentication code matches the first authentication code;
   obtaining, by the secure subsystem via a secure memory, a device identifier;
   generating, by the secure subsystem via an encryptor and the secure processor, a device authentication key based at least partially on the device identifier and the application key, the encryptor to encrypt the device identifier and the application key; and
   generating, by the secure subsystem via the encryptor and the secure processor, a secure application key including a random seed, the application key and the device authentication key, in accordance with the determination that the first authentication code and the second authentication code match, the encryptor to encrypt the device authentication key.

2. The method of claim 1, further comprising: obtaining a factory key; encrypting the application key with the factory key; and decrypting, by the secure subsystem via the secure processor, the encrypted application key with the factory key, wherein the transmitting to the secure subsystem further comprises transmitting the factory key to the secure subsystem.

3. The method of claim 2, further comprising: receiving an encrypted factory key based at least partially on the factory key; and decrypting, by the secure subsystem via the secure processor, the factory key, wherein the transmitting to the secure subsystem further comprises transmitting the encrypted factory key to the secure subsystem.

4. The method of claim 3, wherein the decrypting the factory key further comprises decrypting the factory key based at least partially on a first hardware key at the local processing system.

5. The method of claim 4, wherein the first hardware key corresponds to a second hardware key at a remote system and associated with the local processing system.

6. The method of claim 2, further comprising: transmitting the factory key to a remote system.

7. The method of claim 1, further comprising: receiving an encrypted authentication key based at least partially on an original authentication key; and obtaining the message authentication code key by decrypting, by the secure subsystem via the secure processor, the encrypted authentication key to obtain the message authentication code key.

8. The method of claim 7, wherein the decrypting the message authentication code key further comprises decrypting the message authentication code key based at least partially on a first hardware key at the local processing system.

9. The method of claim 8, wherein the first hardware key corresponds to a second hardware key at a remote system and associated with the local processing system.

10. The method of claim 7, further comprising: transmitting the original authentication key to a remote system.

11. The method of claim 1, further comprising: obtaining by the secure subsystem via the secure processor, a device identifier key; and encrypting, by the secure subsystem via the encryptor and the secure processor, the secure application key based at least partially on the device identifier key.

12. The method of claim 11, further comprising: transmitting the encrypted secure application key from the secure subsystem to a system memory of the local processing system.

13. The method of claim 1, further comprising: generating, by the secure subsystem via the secure processor, the random seed.

14. A local processing system comprising:
    a system memory;
    a secure subsystem; and
    a system processor configured to:
      generate a first authentication code based at least partially on a message authentication code key and an application key;
      transmit the message authentication code key, the application key, and the first authentication code;
    a secure processor of the secure subsystem operatively coupled to the system processor and configured to:
      receive the message authentication code key, the application key, and the first authentication code;
      generate a second authentication code based at least partially on the message authentication code key and the application key;
      determine that the second authentication code matches the first authentication code;
    a secure memory of the secure subsystem operatively coupled to the secure processor and configured to obtain a device identifier; and
    an encryptor of the secure subsystem operatively coupled to the secure processor and configured to:
      generate, in accordance with the determination that the first authentication code and the second authentication code match, a secure application key including a random seed, the application key and a device authentication key, wherein the device authentication key is generated at least partially based on the device identifier and the application key.

15. The system of claim 14, wherein the system processor is further configured to obtain a factory key, encrypt the application key with the factory key, transmit the factory key, and wherein the secure processor of the secure subsystem is further configured to receive the factory key, and to decrypt the encrypted application key with the factory key.

* * * * *